(12) United States Patent
Cheung et al.

(10) Patent No.: US 6,768,230 B2
(45) Date of Patent: Jul. 27, 2004

(54) MULTIPLE MAGNET TRANSDUCER

(75) Inventors: Jeffrey T. Cheung, Thousand Oaks, CA (US); Hao Xin, Sherman Oaks, CA (US)

(73) Assignee: Rockwell Scientific Licensing, LLC, Thousand Oaks, CA (US)

( * ) Notice: Subject to any disclaimer, the term of this patent is extended or adjusted under 35 U.S.C. 154(b) by 0 days.

(21) Appl. No.: 10/077,945

(22) Filed: Feb. 19, 2002

(65) Prior Publication Data

US 2003/0155827 A1 Aug. 21, 2003

(51) Int. Cl.$^7$ ............................................. H02K 35/02
(52) U.S. Cl. ............................ 310/30; 310/17; 290/1 R; 322/3
(58) Field of Search .............................. 310/17, 12–15, 310/23, 24, 152, 30, 34, 19, 28; 33/366.18; 73/745; 290/1 R, 42, 43, 53, 54; 322/1, 3

(56) References Cited

U.S. PATENT DOCUMENTS

| | | | |
|---|---|---|---|
| 3,083,469 A | * 4/1963 | Herbst | 33/366.24 |
| 3,554,617 A | 1/1971 | Weaver | 308/3 |
| 3,726,574 A | 4/1973 | Tuffias et al. | 308/36.3 |
| 3,746,407 A | 7/1973 | Stiles et al. | 308/36.3 |
| 3,834,775 A | 9/1974 | Tuffias et al. | 308/36.3 |
| 3,977,739 A | 8/1976 | Moskowitz et al. | 308/187 |
| 4,064,409 A | 12/1977 | Redman | 310/306 |
| 4,171,818 A | 10/1979 | Moskowitz et al. | 277/80 |
| 4,260,901 A | 4/1981 | Woodbridge | 290/42 |
| 4,356,098 A | 10/1982 | Chagnon | 252/62.51 |
| 4,357,024 A | 11/1982 | Raj | 277/1 |
| 4,430,239 A | 2/1984 | Wyman | 252/62.51 |
| 4,485,024 A | 11/1984 | Furumura et al. | 252/62.56 |
| 4,645,960 A | * 2/1987 | Hoffman | 310/90.5 |
| 4,673,997 A | 6/1987 | Gowda et al. | 360/107 |
| 4,687,596 A | 8/1987 | Borduz et al. | 252/510 |
| 4,706,498 A | 11/1987 | Nemnich et al. | 73/516 |
| 4,732,706 A | 3/1988 | Borduz et al. | 252/510 |
| 4,734,606 A | 3/1988 | Hajec | 310/90.5 |

(List continued on next page.)

FOREIGN PATENT DOCUMENTS

| | | | |
|---|---|---|---|
| DE | 3841011 A | 6/1990 | H02K/51/00 |
| DE | 19810211 A | 9/1999 | |
| DE | 2011395 U1 | 1/2002 | H04M/1/21 |
| EP | 206516 A2 | 12/1986 | H01F/1/28 |
| FR | 2407599 A | 3/1979 | H02K/35/02 |
| GB | 1504872 A | 3/1978 | F16C/39/02 |
| JP | 2001258234 A | 9/2001 | H02K/35/04 |

OTHER PUBLICATIONS

Electric Motors and Motor Controls; Jeff Keljik; 1995; Delmar Publishers; pp. 139–142.*

Calin Popa N et al, "Gravitional electrical generator on magnetic fluid cushion", Journal of Magnetism and Magnetic Materials, Elsevier Science Publishers, Amsterdam, Wt. vol. 201, WX 1–1, pp. 407–409 XP004161287, ISSN: 0304–8853, p. 408, column 1, line 1–3, figure 1,2 received May 25, 1998, revceived in revised form Sep. 21, 1998.

(List continued on next page.)

Primary Examiner—Burton S. Mullins
Assistant Examiner—Judson H. Jones
(74) Attorney, Agent, or Firm—Koppel, Jacobs, Patrick & Heybl (57) ABSTRACT

A dynamic magnet system, particularly useful for electrical generation, employs multiple magnets in polar opposition to each other and having a critical angle of displacement from a horizontal static position of less than 1 degree, to induce an electrical signal in one or more surrounding coils. The magnets interact with each other to yield multiple modes of oscillation and a greater range of response to applied inputs than is achievable with a single magnet system. A lubricant for the magnets is preferably a ferrofluid that establishes a static coefficient of friction between the magnets and their support structure less than about 0.02, with a viscosity less than 10 centipoise. The magnets can be oriented for movement in a primarily horizontal direction and are adaptable to numerous different kinds of support structures, including ring-shaped.

31 Claims, 5 Drawing Sheets

U.S. PATENT DOCUMENTS

| | | | |
|---|---|---|---|
| 4,797,013 A | 1/1989 | Raj et al. | 384/462 |
| 4,814,654 A | 3/1989 | Gerfast | 310/154.28 |
| 4,898,480 A | 2/1990 | Raj et al. | 384/446 |
| 4,938,886 A | 7/1990 | Lindsten et al. | 252/62.51 |
| 4,965,864 A * | 10/1990 | Roth et al. | 310/17 |
| 5,085,789 A | 2/1992 | Yokouchi et al. | 252/62.52 |
| 5,175,457 A | 12/1992 | Vincent | 310/15 |
| 5,323,076 A | 6/1994 | Hajec | 310/90 |
| 5,347,186 A | 9/1994 | Konotchick | 310/17 |
| 5,358,648 A | 10/1994 | Chakravarti | 252/8.6 |
| 5,376,862 A | 12/1994 | Stevens | 310/75 |
| 5,417,507 A | 5/1995 | Uno et al. | 384/107 |
| 5,444,313 A | 8/1995 | Oudet | 310/17 |
| 5,452,520 A | 9/1995 | Raj et al. | 33/366 |
| 5,471,100 A * | 11/1995 | Sakamoto et al. | 310/12 |
| 5,490,425 A | 2/1996 | Raj et al. | 73/745 |
| 5,578,877 A | 11/1996 | Tiemann | 310/15 |
| 5,587,242 A * | 12/1996 | Hou et al. | 428/402 |
| 5,713,670 A | 2/1998 | Goldowsky | 384/125 |
| 5,775,169 A | 7/1998 | Solomon et al. | 74/490.01 |
| 5,780,741 A | 7/1998 | Raj | 73/514.08 |
| 5,818,132 A | 10/1998 | Konotchick | 310/17 |
| 5,851,416 A * | 12/1998 | Raj et al. | 252/62.52 |
| 5,899,220 A | 5/1999 | Alcocer et al. | 137/13 |
| 5,908,987 A | 6/1999 | Raj | 73/514.09 |
| 5,950,543 A * | 9/1999 | Oster | 104/138.1 |
| 6,020,664 A | 2/2000 | Liu et al. | 310/90 |
| 6,056,889 A | 5/2000 | Tsuda et al. | 252/62.52 |
| 6,083,082 A | 7/2000 | Saldana | 451/5 |
| 6,103,107 A * | 8/2000 | Raj | 210/97 |
| 6,208,743 B1 | 3/2001 | Marten et al. | 381/415 |
| 6,220,719 B1 | 4/2001 | Vetorino et al. | 162/192 |
| 6,254,781 B1 | 7/2001 | Raj | 210/695 |
| 6,261,471 B1 | 7/2001 | Tsuda et al. | 252/62.52 |
| 6,277,298 B1 | 8/2001 | Borduz et al. | 252/62.52 |
| 6,313,551 B1 | 11/2001 | Hazelton | 310/12 |
| 6,501,357 B2 | 12/2002 | Petro | 335/227 |
| 6,570,273 B2 | 5/2003 | Hazelton | 310/23 |

OTHER PUBLICATIONS

Patent Abstract of Japan, vol. 2000, No. 26, Jul. 1, 2002, & JP 2001 258234 A (NIT ME Kansai Corp.), Sep. 21, 2001 absract, 'Inertial Generation Equipment and Communication System', Kurakawa Naoyuki.

Patent Abstracts of Japan, vol. 013, No. 014 (M–784), Jan. 13, 1989, –& JP 63 225718 A (Hitachi Electronics Eng Co LTD), Sep. 20, 1988 abstract.

Patent Abstracts of Japan, vol. 007, No. 012 (M–186) Jan. 19, 1983, & JP 57 171117 A (Fuji Xerox KK), Oct. 21, 1982 abstract.

Patent Abstracts of Japan, vol. 002, N0. 044 (M–013), Mar. 24, 1978, –&JP 53 002865 A (Inque Japax RES Inc), Jan. 12, 1978 figure 1.

Electric Motors and Motor Controls; Jeff Keljik; 1995; Delmar Publishers; pp. 139–142, month unknown.

Patent Abstracts of Japan, vol. 2000, No. 14, Mar. 5 2001 & JP 2000 308327 A ( Makino Tadashi Kenkyusho;XX), Nov. 2, 2000 abstract.

* cited by examiner

MULTIPLE MAGNET TRANSDUCER

BACKGROUND OF THE INVENTION

1. Field of the Invention

This invention relates to dynamic magnet systems, and more particularly to systems in which the linear motion of a magnet is used to generate electric power.

2. Description of the Related Art

Moving a magnet through a conductive coil induces a current flow in the coil. If the magnet is moved back and forth in a reciprocating motion, the direction of current flow in the coil will be reversed for each successive traverse, yielding an AC current.

Several electrical generating systems have been disclosed that make use of reciprocating magnet movement through one or more coils. For example, in various embodiments of U.S. Pat. No. 5,347,185, one, two or three rare earth magnets are positioned to move linearly back and forth relative to one or more coils. The magnets can either be fixed and the coil moved up and down relative to the magnet as by wave action, the coil can be fixed and the magnet moved relative to the coil as by pneumatic pressure, or the coil housing can be shaken or vibrated as by being carried by a jogger, all causing a reciprocating motion of a magnet which moves within the coil. In one embodiment four magnets are provided in successive polar opposition, with the two end magnets fixed and the middle magnets free to move back and forth along respective portions of a tube. The two middle magnets are separated from each other by the carrier for a middle coil, the carrier being approximately twice as wide as either of the middle magnets.

In U.S. Pat. No. 5,818,132, one embodiment discloses three moving magnets that are suspended within a vertical tube in polar opposition to each other and a pair of end magnets, with a number of coils spaced along the outside of the tube. To minimize friction between the moving magnets and the tube, the tube is oriented in a vertical position and moved up and down to move the magnets relative to the coils, thus generating currents in the coils. However, the vertical orientation interferes with the motion of the magnets, which have to fight gravitational forces to move relative to the tube. The coupling of tube movements into magnet motion, with a corresponding electrical output, is thus reduced.

SUMMARY OF THE INVENTION

The present invention provides a dynamic multiple magnet system which allows for an increased coupling between a support structure for the magnets and the motion imparted to the magnets themselves. This allows the support structure to be oriented for magnet movement in a primarily horizontal direction, thus greatly increasing the sensitivity of the device to applied motion.

These improvements are achieved by providing ultra low friction bearings between a plurality of magnets and a support structure, with the magnets arrange in polar opposition to each other. The critical angle of displacement for the magnets from a horizontal static position is less than 1 degree, and can be less than 10 minutes. The bearings are preferably implemented with a ferrofluid that establishes a static coefficient friction between the magnets and enclosure less than about 0.02. The ferrofluid preferably has a viscosity less than 10 centipoise, and in one embodiment comprises a light mineral oil medium mixed with isoparaffinic acid.

Rather than a single oscillation mode associated with a single magnet system, the multiple magnets have multiple oscillation modes that cause them to actively respond to numerous different types of applied support structure movements. Thus, electricity can be generated in response to random or semi-random movements, even when the movements are very gentle. Even numbers of moving magnets which move along a common axis can be used, with successive magnets kept apart only by their opposing magnetic polarities.

The dynamic magnet system can be used to power numerous operating systems, such as flashlights, cellular telephones, environmental sensors and emergency transmitters, either by powering the devices in real time or by charging associated batteries for the devices.

The invention further contemplates the use of one or more magnets that move relative to a support structure that has a ring-shaped axis. The magnets are oriented in polar opposition to move along the axis in response to support structure movements. Great sensitivity can be achieved when the orientation is primarily horizontal, as in a wave powered device that is floated on water or a wind powered device suspended in air.

These and other features and advantages of the invention will be apparent to those skilled in the art from the following detailed description, taken together with the accompanying drawings.

DETAILED DESCRIPTION OF THE INVENTION

The present invention provides for a more effective and flexible electrical power generation than has previously been available in oscillating magnet systems. Electricity can be effectively generated from very slight movements of the magnet support structure off a horizontal plane and/or movements in a horizontal plane. For example, a walking motion or other normal motions such as turning, tapping, bowing, or even riding is a vehicle that is subject to vibration, can easily generate useful amounts of electricity when the support structure for the magnets is held in the user's hand or in a shirt pocket, while slight off-horizontal movements due to wave or wind action can also be used for electrical generation. An almost limitless number of other actuators can be envisioned, including mounting on vehicles or machinery.

The invention employs multiple magnets that move relative to a common support structure. It is not restricted to the three magnets required for the multi-magnet system of U.S.

Pat. No. 5,818,132, but rather can employ virtually any number of magnets, including even numbers. In fact, two-magnet systems can be more effective than three-magnet systems, since there is more space left for magnet movement in a two-magnet system. The requirement for a vertical orientation for the multi-magnet system of U.S. Pat. No. 5,181,132 is also eliminated, allowing for a horizontal magnet motion that is much more sensitive to movements of the support structure.

Figure 1:
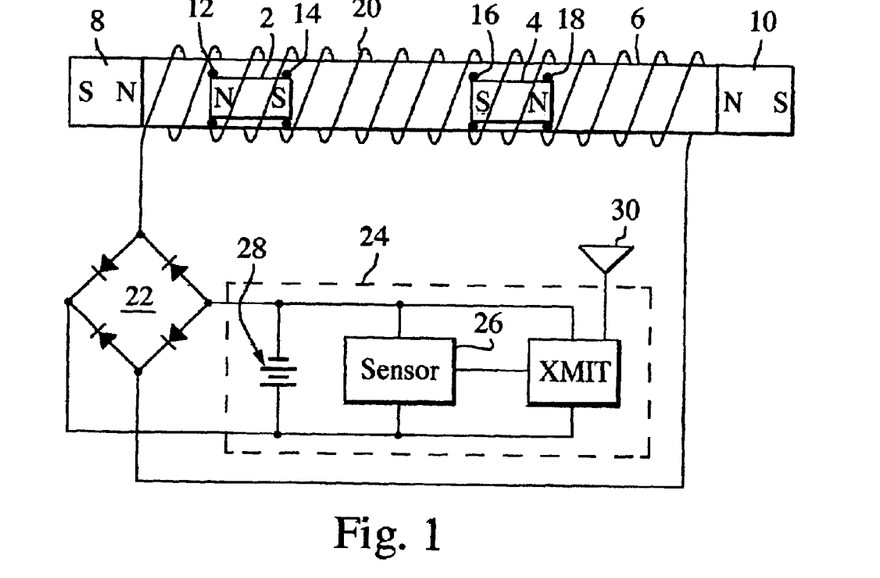
FIGS. 1, 2 and 3 are schematic diagrams illustrating the application of the invention to environmental sensor, emergency transmitter and flashlight applications, respectively.

FIG. 1 illustrates the application of the invention to an environmental sensor. In this embodiment, two moving magnets 2 and 4 move along the axis of a support structure in the form of a tubular non-magnetic enclosure 6. The magnets are in polar opposition to each other, with their facing ends of like magnetic polarity. Thus, the magnets mutually repel each other when they come into proximity. Additional fixed magnets 8 and 10 are positioned at opposite ends of the enclosure in polar opposition to their nearest respective moving magnets 2 and 4. The ends of the moving and end magnets which face each other are also of like magnetic polarity.

It has been found that, for slight impacts to the enclosure or slight off-horizontal enclosure movements, the magnets 2 and 4 can slide along the enclosure 6 if the static coefficients of friction between the magnets and enclosure are less than about 0.02, but magnet movement will not occur with higher frictional coefficients. To achieve this low level of friction, ferrofluid bearings are preferably employed as an interface between the magnets and the enclosure. Ferrofluids are dispersions of finely divided magnetic or magnetizable particles, generally ranging between about 30 and 150 Angstroms in size, and dispersed in a liquid carrier. The magnetic particles are typically covered with surfactants or a dispersing agent. The surfactants assure a permanent distance between the magnetic particles to overcome the forces of attraction caused by Van der Waal forces and magnet interaction, and also provide a chemical composition on the outer layer of the covered particles which is compatible with the liquid carrier and the chemicals in the surrounding environment. Ferrites and ferric oxides employed as magnetic particles offer a number of physical and chemical properties to the ferrofluid, including saturation magnetization, viscosity, magnetic stability and chemical stability.

Several types of ferrofluids are provided by Ferrotec (USA) Corporation of Nashua, N.H. A summary of patents related to the preparation of ferrofluids is provided in U.S. Pat. No. 6,056,889, while the use of ferrofluid bearings in a sliding magnet electrical generator as discussed in copending patent application Ser. No. 10/078,724, entitled "Electrical Generator With Ferrofluid Bearings", filed on the same day as the present invention by applicants Jeffrey T. Cheung and Hac Xin, and also assigned to Innovative Technology Licensing, LLC, the assignee of the present invention. The contents of this copending application are hereby incorporated herein by reference.

The characteristics of the ferrofluid and magnets are related. If the magnets have a relatively low magnetic field, a ferrofluid of relatively high magnetization should be used. The magnets magnetic fields will typically range from about 500–4000 Gauss, and the magnetization of the ferrofluid from about 50–400 Gauss.

The ferrofluid's frictional coefficient is roughly related to its viscosity (measured in centipoise (cp)), but not directly. For example, a ferrofluid with a viscosity of 300 cp has been found to have a static friction coefficient of about 0.015, the EFH1 ferrofluid from Ferrotec (USA) Corporation has a viscosity on the order of 6 cp and a static friction coefficient of about 0.002, but a water based ferrofluid with a viscosity of 5 cp has been found to have a static friction coefficient of about 0.01. The higher friction coefficient for the somewhat lower viscosity composition has been attributed to a surface tension associated with a water based solvent.

A preferred ferrofluid composition for the present invention has a viscosity substantially less than 5 cp, actually less than 2 cp, and achieves an ultra low coefficient of static friction in the range of 0.0008–0.0012. This is sensitive enough for a magnet on a beam to begin sliding when the beam is tilted only about 0.07 degrees off horizontal. This and other suitable ferrofluid compositions are discussed in copending patent application Ser. No. 10/078,132, entitled "Mechanical Translator With Ultra Low Friction Ferrofluid Bearings", filed on the same day as the present invention by applicant Jeffrey T. Cheung, and also assigned to Innovative Technology Licensing, LLC, the assignee of the present invention, the contents of which application are hereby incorporated herein by reference. The composition comprises a mixture of one part Ferrotec (USA) Corporation EPH1 light mineral oil ferrofluid, mixed with from two to four parts of isoparaffinic acid, stirred for 24 hours. Suitable sources of isoparaffinic acid are Isopar G and Isopar M hydrocarbon fluids from ExxonMobil Chemical Corp.

Undiluted EFH1 ferrofluid could also be used. Undiluted EFH1 composition has a greater weight bearing capacity than the diluted version, but diluting the composition will retain sufficient weight bearing capability for most applications. Other ferrofluids with static friction coefficients up to about 0.02 could also be used, such as Ferrotec (USA) Corporation type EMG805, a water based ferrofluid with a static friction coefficient of about 0.01 and a viscosity of about 5 cp, since the power output achievable with a 0.01 static friction coefficient is still about 75% that achievable with a zero friction system. At present the EMG805 composition is considerably more expensive than the EFH1 composition and has a somewhat lesser load bearing capability. In general, suitable ferrofluids will yield a critical angle of displacement from a horizontal static position of less than 1 degree to initiate magnet movement, and with the mixture described above the critical angle is less than 10 minutes.

Returning to FIG. 1, a ferrofluid within the enclosure 6 is naturally attracted to the poles of magnets 2 and 4 to form beads 12, 14 and 16, 18 around the end poles of magnets 2 and 4, respectively. This provides an ultra low friction lubricant that allows the magnets to freely slide with respect to the enclosure. The magnets will slide in response to a tilting of the enclosure away from horizontal, a horizontal movement of the enclosure, or more complex compound movements. The kinetic energy of the moving magnets is converted to potential energy as they approach their respective end magnets, and then back to kinetic energy as they are repelled away from the end magnets.

A conductive coil 20, typically copper, is wound around the portion of the enclosure that is traversed by the magnets 2 and 4 in their slide paths between the end magnets 8 and 10. A movement of the enclosure that causes the magnets to slide generates a current in coil 20 due to the magnetic field lines cutting the turns of the coil. The repulsive effect of end magnets 8 and 10 limits the travel of sliding magnets 2 and 4 with a cushioning effect that prevents the moving magnets from striking the hard end magnets. Since the magnetic repulsion force varies with $1/d^4$, where d is the distance between two magnets, the repulsive force increases very rapidly as the sliding magnets approach the end magnets.

Magnets 2 and 4 and enclosure 6 each preferably have generally circular cross-sections. The dimensions of the components are preferably selected to leave a gap between the ferrofluid beads 12, 14, 16, 18 and the upper enclosure wall, thereby preventing an air buildup on one side of the sliding magnets and a partial vacuum on the other side that could otherwise develop and retard the magnets' movements. Alternately, the magnets could be perforated to allow an air flow between their opposite sides if it is desired that (together with the ferrofluid beads) they occupy the full cross-sectional inner area of the enclosure.

A movement imparted to the enclosure 6 causes the magnets 2 and 4 to reciprocate or oscillate back and forth. Depending upon the particular application, the enclosure movement can be a single axial movement, reciprocating along a longitudinal axis, pivoting about a center axis, rotational, or other more complex forms of movement. As described in further detail below, the magnets have multiple modes of oscillation, making them more receptive to coupling different types of enclosure motion into the magnets than is the case with a single magnet system. This allows the system to be usefully employed with numerous different types of periodic enclosure movements, and also with random or quasi-random enclosure movements.

In the embodiment illustrated in FIG. 1, the current induced in coil 20 by the magnet movements is rectified by a bridge circuit 22 and used to power an operating system 24 that comprises an environmental sensor 26 for sensing one or more environmental conditions such as temperature, pressure, gases, radiation or the like, powered by a battery 28. To establish the sensor at a remote location, a transmitter 30 can be provided to transmit information concerning the sensed condition, with the transmitter also operated off of battery 28. Alternately, the sensor 26 can be operated in real time, directly from the output of coil 20 or bridge circuit 22, by eliminating the battery 28.

Figure 2:
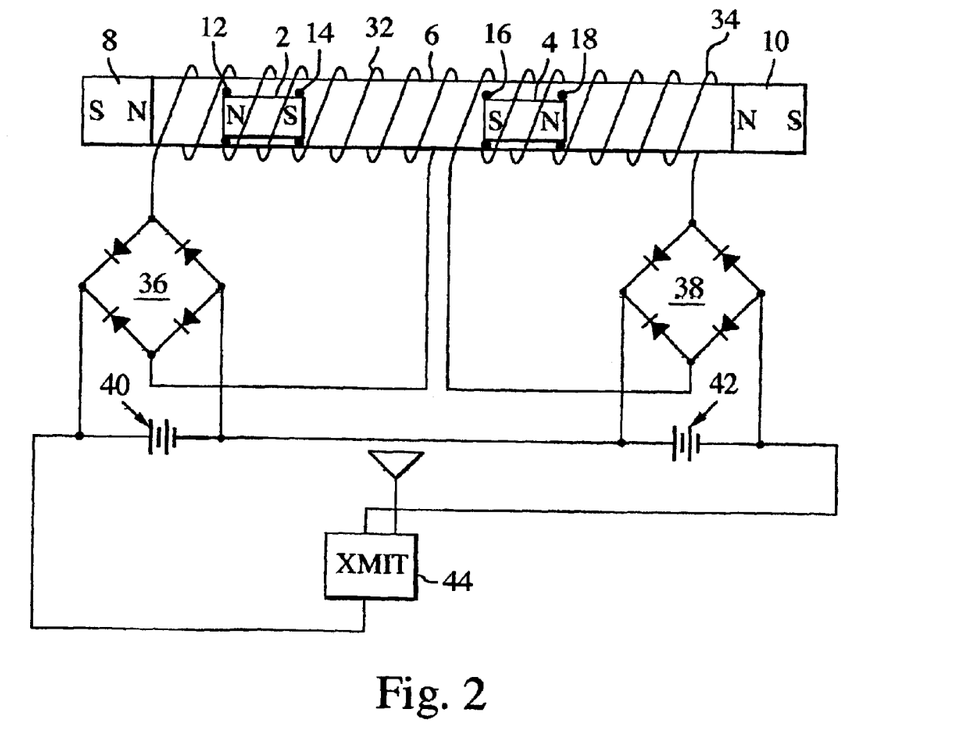

The invention has many applications, a few of which are illustrated herein. The application of the invention to an emergency transmitter is illustrated in FIG. 2, with common elements indicated by the same reference numbers as in FIG. 1. In this embodiment a pair of separate coils 32 and 34 are wound on respective halves of the enclosure 6. This is more effective than the single coil embodiment of FIG. 1, since the two magnets 2, 4 are frequently found on opposite halves of the enclosure and often travel in opposite directions. With the single coil embodiment of FIG. 1, the magnets induce opposing currents in the coil when they are moving in opposite directions, thus reducing the overall electrical output. In the embodiment of FIG. 2, on the other hand, the use of two separate coils effectively allows the absolute current values in each coil to be accumulated, regardless of the directions in which the two magnets are moving. This is accomplished in FIG. 2 by connecting coils 32 and 34 to respective full-wave bridge rectifying circuits 36 and 38, the outputs of which charge batteries 40 and 42, respectively. The batteries can be connected in series as shown, or in parallel if desired to provide power in an operating system that includes an emergency transmitter 44.

Figure 3:
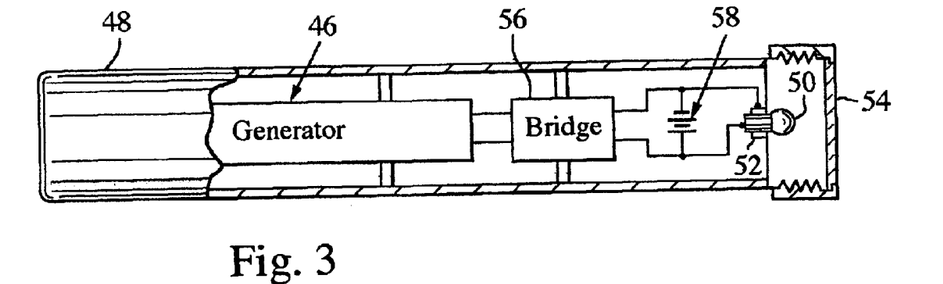

FIG. 3 illustrates the invention as applied to a hand held flashlight. An electrical generator 46 as described above is provided within a flashlight housing 48, with an illuminating bulb 50 at one end held to a bulb contact 52 and emitting light through a transparent plate 54 that can be screwed off to access the bulb. As with the other embodiments described above, the generator 46 provides an AC output that is rectified by bridge circuitry 56 which charges one or more batteries 58 connected in circuit with the bulb contact 52. Again, the battery can be eliminated if real time flashlight operation is desired.

Figure 4:
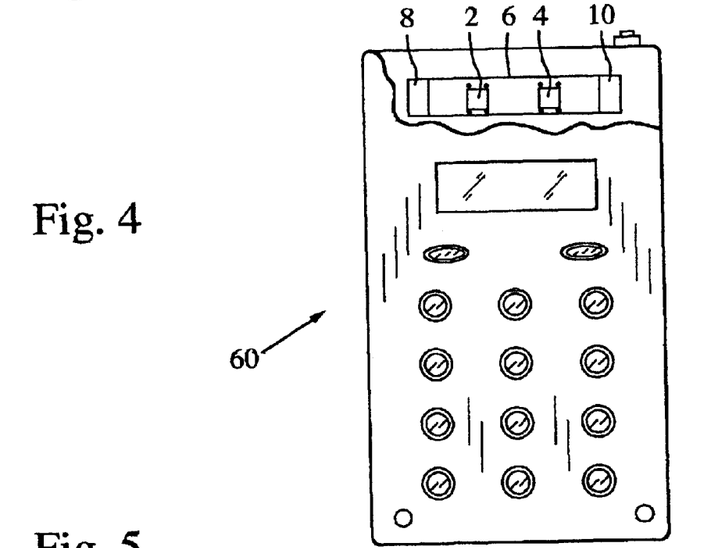
FIG. 4 is a partially broken away plan view of a cellular telephone powered in accordance with the invention.

FIG. 4 illustrates the application of the invention to a cellular telephone 60 that can be placed in a person's shirt pocket; for purposes of simplification the coil or coils wound on the magnet enclosure 6 are not shown.

The magnet enclosure 6 is supported within the cell phone 60 so that it has a generally horizontal orientation when the phone is placed upright in the user's shirt pocket or held in a belt clip. The motion sensitivity achieved with the invention allows power outputs on the order of 0.4 watts to be readily achieved with the movement accompanying a normal walking motion, whereas a typical cell phone presently consumes an average power of about 0.2 watts. Thus, cell phones and like devices constitute an important application for the invention.

Figure 5:
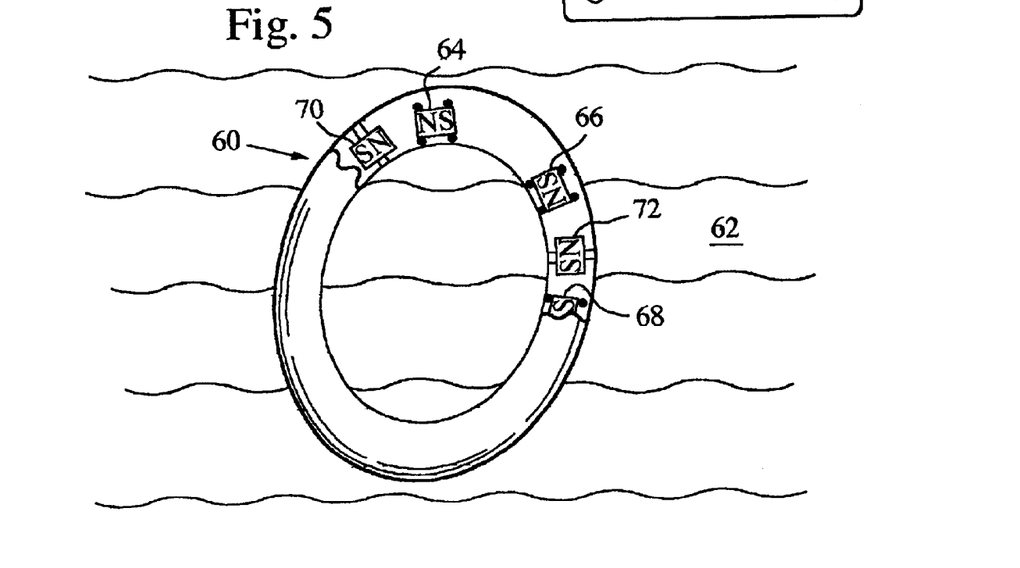
FIGS. 5 and 6 are simplified perspective views of electrical generators in accordance with the invention actuated in response to wave and air motion, respectively.

An electrical generator operated by wave action is illustrated in FIG. 5. This system is useful for powering an emergency transmitter, a repeater station for underwater cable, or other marine applications requiring an electrical power source that is not otherwise available. In the illustrated embodiment, the generator is provided in the form of a buoyant ring 61 which floats upon water 62. The ring is tubular and houses at least one, and preferably a plurality of moving magnets, of which magnets 64 and 66 and a portion of magnet 68 are visible in the partially broken away view shown. As before, the adjacent moving magnets are in polar opposition to each other, with ferrofluid bearings on the magnets providing ultra low friction contacts with the tubular enclosure. A relatively large number of moving magnets can be provided and allowed to move freely within the ring. With normal wave action, most or all of the magnets may tend to move in the same direction much of the time, allowing a single continuous coil to be provided all around the ring. However, if it is desired to associate each moving magnet primarily with a single pickup coil so that opposing directions of movement for the different magnets do not subtract from the accumulated power output, the interior of the ring could be segmented as illustrated in FIG. 5 by fixed magnets such as 70 and 72, each in polar opposition to the moving magnets on either side. Separate coils (not shown) could be would around each half of each tube segment, making it less likely for different magnets to produce opposing currents in the same coil. Associated rectifier circuits, batteries and operating systems (not shown) could be provided, with an associated device operated by the electrical signals produced in response to magnet movement. In the illustrated embodiment the ring is segmented into four sections of two magnets each.

Figure 6:
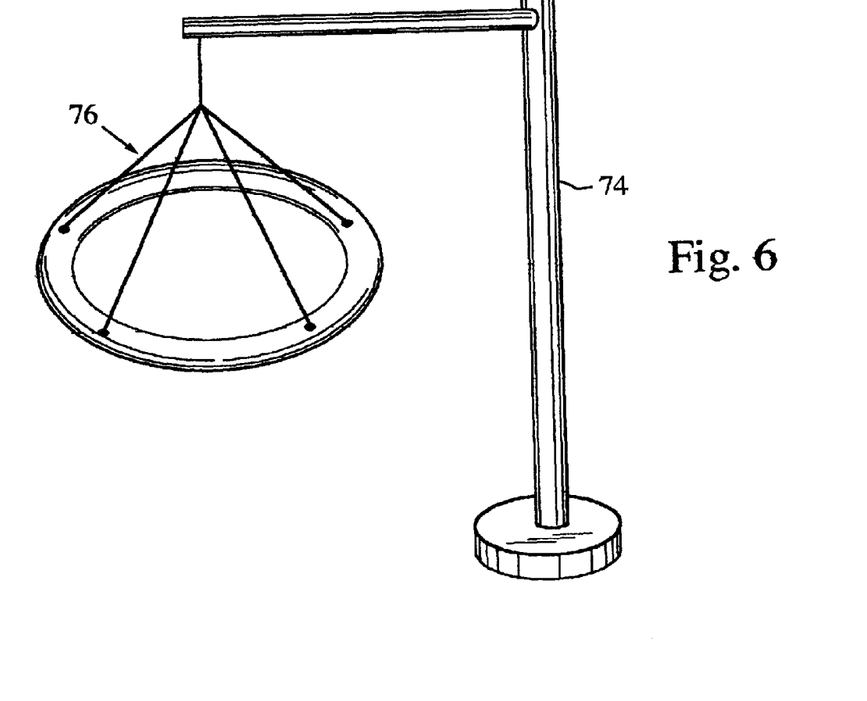

FIG. 6 illustrates a wind-powered device that is similar to the ring-shaped marine generator of FIG. 5, but is suspended in air and moved by the wind to generate electricity. A support structure 74 includes a suspension system 76 that suspends the apparatus in air, where it can be blown by the wind. Wind vanes or other embellishments could be added to increase the generator's profile and make it more sensitive to wind. As the enclosure swings due to wind action, the magnets which it houses move through the interior of the ring to produce an electrical output.

The invention has many other applications involving devices that are hand held, portable or otherwise subject to motion. For example, an electrical generator as described herein could be installed on the axle of an automobile or other vehicle to capture vibrations from the vehicle's movement, and used to generate electrical power for air pressure sensors embedded in the vehicle tires. The pressure information could be transmitted to a driver display to provide a warning of low or high pressure conditions.

Figure 7A:
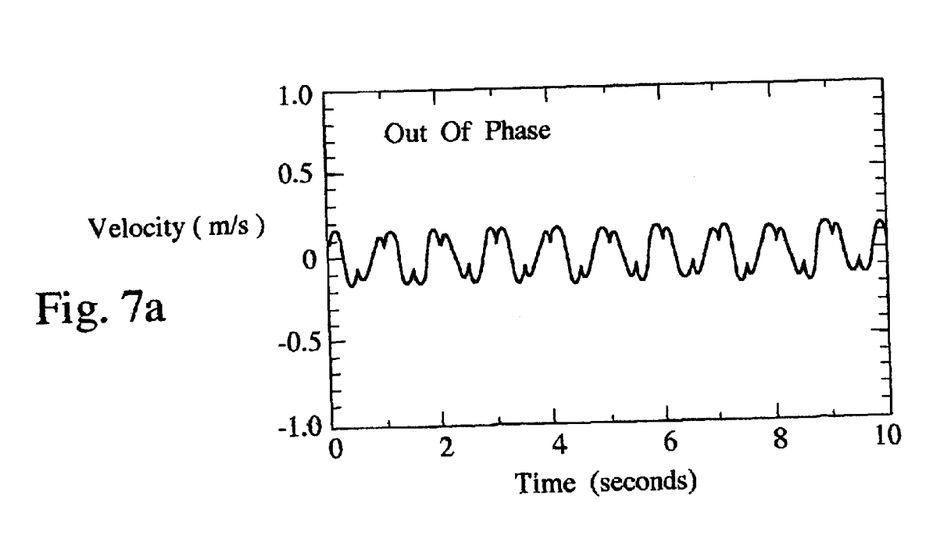
FIGS. 7a and 7b are calculated plots of magnet velocity versus time in a single magnet system for out-of-phase and in-phase actuations, respectively.
Figure 7B:
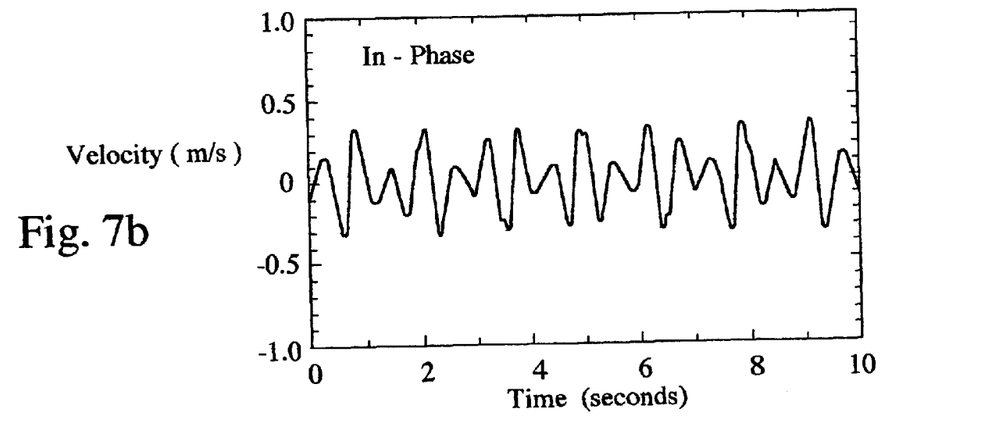

Some of the limitations of a single magnet system are illustrated in FIGS. 7a and 7b, which illustrate calculated responses of a single magnet system to applied translational forces which are respectively out-of-phase (FIG. 7a) and in-phase (FIG. 7b) with the system's initial magnet movement. The system is assumed to have a natural or resonant frequency of 1 Hz, refering to the oscillation frequency of the magnet within the enclosure that is induced in response to a single axial movement of the enclosure. For purposes of these calculations, a frictionless system was assumed with an undamped magnet response.

In FIG. 7a, the magnet is assumed to be at the center of the enclosure and moving in a direction counter to the impulse applied to the enclosure (out-of-phase), while in FIG. 7b the magnet is assumed to initially be centered but moving in the same direction as the applied impulse (in-phase). The plots show the calculated velocity of the magnet as it oscillates back and forth in response to a single applied translation of the enclosure. It can be seen that the peak velocities for the in-phase trial are approximately twice those with the out-of-phase trial, which would produce a correspondingly greater electrical output for the in-phase situation. These calculations illustrate a single mode of oscillation which characterizes a single magnet system. The magnet will have only a single primary oscillation mode, with a markedly reduced response to other inputs. Thus, its effective power generation capability is seriously limited when the system operates in response to random or quasi-random inputs, such as those produced by a walking motion or wave/wind action, or to a periodic input that is out-of-phase with the initial magnet movement.

Figure 8A:
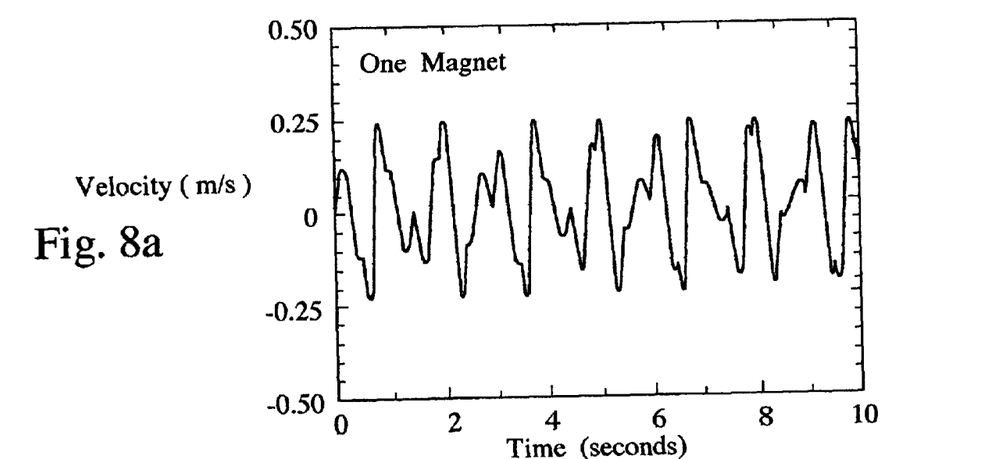
FIGS. 8a and 8b are calculated plots of magnet velocity as a function of time for one and two magnet systems, respectively.
Figure 8B:
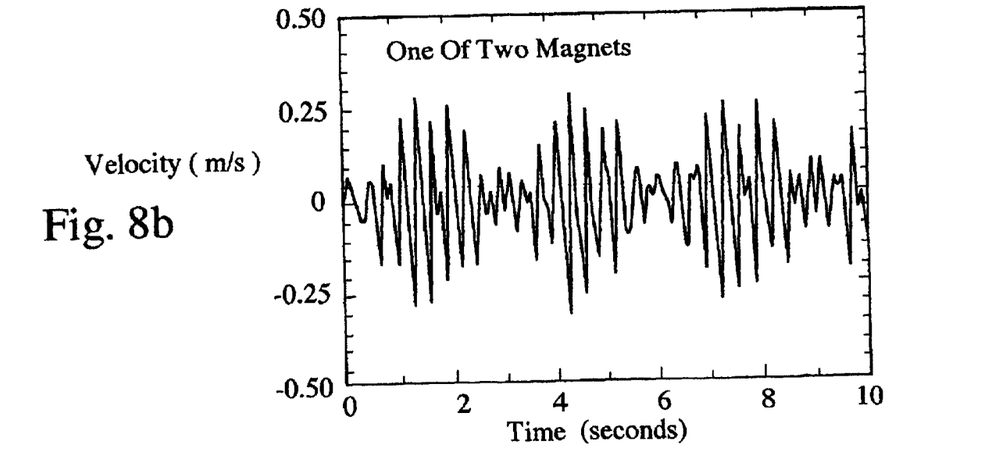

FIGS. 8a and 8b illustrate the much greater capability of the present multi-magnet system to produce a useful output in response to enclosure movements that are not periodic at the natural frequency, or are out-of-phase with the initial magnet movement. FIG. 8a illustrates the response of a single magnet system with a 1 Hz natural frequency to an in-phase pulse, again assuming zero friction between the magnet and its enclosure. It can be seen that the magnet oscillates with only one basic natural frequency, and the illustrated response is optimum. A reduced magnet movement results from inputs that are at frequencies other than the single natural frequency, and from out-of-phase inputs.

FIG. 8b represents the calculated response for one of two magnets in a dual magnet system such as that shown in FIG. 1 or 2. In contrast to the single magnet system, each magnet in the dual system has numerous modes of operation, as indicated by the several peak velocities during each one second period. These multiple modes of oscillation provide many more vehicles for coupling applied inputs into movement of the magnets. With a varying input, it is considerably more likely that the input at any given time will be at or near one of the multi-magnet system's numerous modes of operation than to the single magnet system's sole oscillation mode. Thus, in the case of an input with a random, quasi-random or sweeping frequency, the input to the multi-magnet system will match one or another oscillation mode several times for each time the single magnet system's oscillation mode is matched. The result is a greatly enhanced coupling of the input force into movement of the magnets.

Figure 9A:
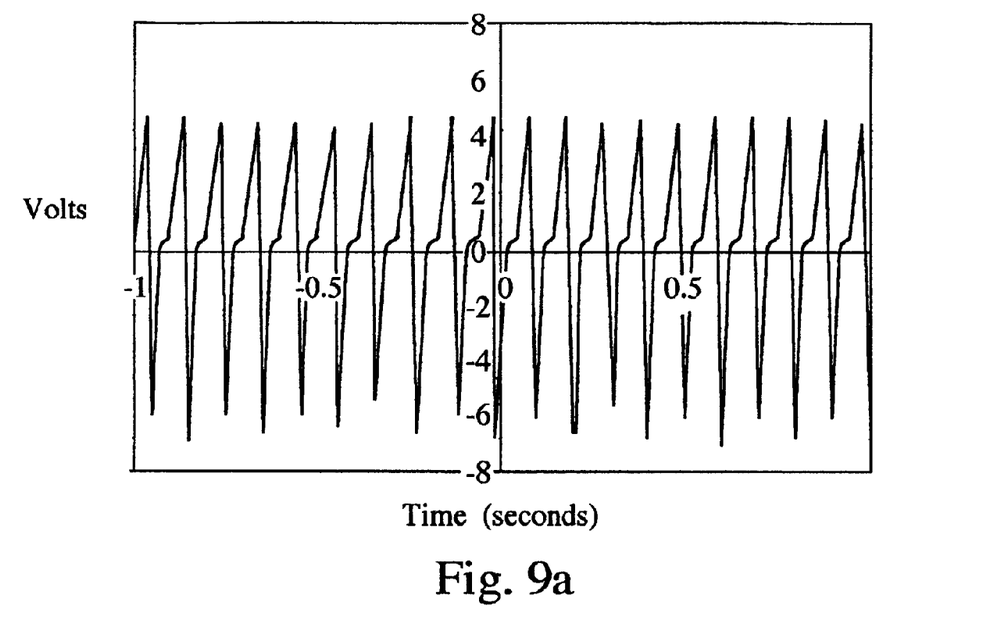
FIGS. 9a and 9b are measured plots of voltage output produced from one and two magnet systems, respectively.
Figure 9B:
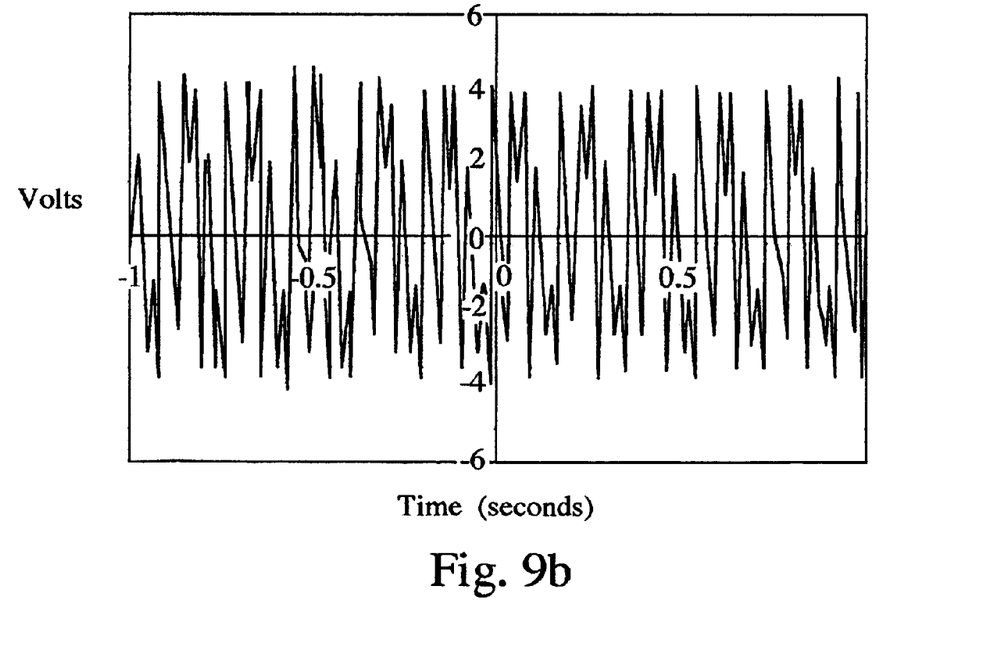

FIGS. 9a and 9b contrast the measured voltage output of single and dual-magnet systems having a natural frequency of 10 Hz. FIG. 9a shows the results when the single magnet system was vibrated back and forth at its 10 Hz resonant frequency. A stack of four magnets with a total thickness of approximately 2.5 cm and a diameter of about 0.95 cm was used with a 2,000 turn coil. The peak voltage output was slightly greater than 4 volts, with a 0.1 second period and a power output of 0.291 watts. Since the vibration applied to the enclosure matched the system's natural frequency, this was a best case situation.

FIG. 9b shows the measured results of a dual magnet system with magnets of the same diameter but half the thickness as for FIG. 9a, and a single 1,600 turn coil around the center of the enclosure. The peak voltages produced were again slightly greater than 4 volts, but occurred more frequently and produced a power output of 0.335 watts. The power production would have been greater if the 2000 turn coil of FIG. 9a had been used for the system of FIG. 9b, since the power produced is generally proportional to the number of turns. The power output could have been increased still further with the use of two coils as in FIG. 2, and the increase over the single magnet system's output would have been even greater had the input not been in-phase with the initial magnet movement and at the single magnet's natural frequency.

The invention thus provides a dynamic magnet system that has a strong response to a much greater range of inputs than previous systems, and enables the production of useful amounts of electricity in applications to which previous systems were not adaptable. While particular embodiments of the invention have been shown and described, numerous variations and additional embodiments will occur to those skilled in the art. For example, greater numbers of magnets could be employed than in the systems illustrated, or different ultra low friction lubricants than the specific compositions described could be used. Also, instead of placing the magnets inside a housing and winding the coils around the outside of the housing, the elements could be reversed with coils inside a housing and a toroidal-shaped magnet outside. Accordingly, it is intended that the invention be limited only in terms of the appended claims.

We claim:

1. A dynamic magnet system, comprising:
a support structure,
an even number of magnets oriented in polar opposition to individually move relative to said support structure along a common axis,
said support structure providing an unobstructed magnet movement path between said magnets,
a conductor oriented with respect to said support structure and magnets so that movement of said magnets induces an electrical signal in said conductor, and
an operating system powered by said signal.

2. The dynamic magnet system of claim 1, further comprising a pair of end magnets along said axis limiting the travel of said moving magnets, said end magnets oriented in polar opposition to the nearest respective moving magnets.

3. The dynamic magnet system of claim 1, said conductor comprising at least one coil wound on said support structure, said support structure being nonconductive.

4. The dynamic magnet system of claim 1, said support structure orienting said magnets for movement in a primarily horizontal direction.

5. The dynamic magnet system of claim 1, said magnets having multiple oscillation modes relative to said support structure.

6. The dynamic magnet system of claim 1, further comprising a ferrofluid bearings between said magnets and said support structure.

7. The dynamic magnet systems of claim 6, said ferrofluid having a viscosity less than 10 centipoise.

8. The dynamic magnet system of claim 6, said ferrofluid comprising a light mineral oil medium mixed with isoparaffinic acid.

9. A dynamic magnet system comprising:

a support structure, an even number of magnets oriented in polar opposition to individually move relative to said support structure along a common axis, said support structure providing an unobstructed magnet movement path between said magnets, and ultra low friction bearings establishing static coefficients of friction between said magnets and said support structure less than about 0.02.

10. The dynamic magnet system of claim 9, said bearings comprising a ferrofluid.

11. The dynamic magnet system of claim 10, said ferrofluid having a viscosity less than 10 centipoise.

12. The dynamic magnet system of claim 10, said ferrofluid comprising a light mineral oil medium mixed with isoparaffinic acid.

13. The dynamic magnet system of claim 9, further comprising a conductor oriented with respect to said support structure and magnets so that movement of said magnets induces an electrical signal in said conductor.

14. The dynamic magnet system of claim 13, said conductor comprising at least one coil wound on said support structure, said support structure being nonconductive.

15. The dynamic magnet systems of claim 13, further comprising an operating system powered by said signal.

16. The dynamic magnet system of claim 9, further comprising a pair of end magnets limiting the travel of said moving magnets, said end magnets oriented in polar opposition to the nearest respective moving magnets.

17. The dynamic magnet system of claim 9, wherein said system has a critical angle of displacement for said magnets from a horizontal static position of less than 1 degree.

18. The dynamic magnet system of claim 17, wherein said critical angle is less than 10 minutes.

19. A dynamic magnet system, comprising:

a support structure, and an even number of magnets oriented in polar opposition to individually move relative to said support structure along a common axis, said support structure providing an unobstructed magnet movement path between said magnets, said magnets having multiple oscillation modes relative to said support structure.

20. A The dynamic magnet system of claim 9, wherein said system has a critical angle of displacement for said magnets from a horizontal static position of less than 1 degree.

21. The dynamic magnet system of claim 20, wherein said critical angle is less than 10 minutes.

22. The dynamic magnet system of claim 19, further comprising a conductor oriented with respect to said support structure and magnets so that movement of said magnets induces an electrical signal in said conductor.

23. The dynamic magnet system of claim 22, further comprising an operating system powered by said signal.

24. The dynamic magnet system of claim 19, further comprising ferrofluid bearings between said magnets and said support structure.

25. The dynamic magnet system of claim 24, said ferrofluid having a viscosity less than 10 centipoise.

26. The dynamic magnet system of claim 24, said ferrofluid comprising a light mineral oil medium mixed with isoparaffinic acid.

27. The dynamic magnet system of claim 19, said support structure orienting said magnets for movement in a primarily horizontal direction.

28. A dynamic magnet system, comprising:

a support structure, and an even number of magnets oriented in polar opposition to individually move relative to said support structure along a common axis, said support structure providing an unobstructed magnet movement path between said magnets, wherein said system has a critical angle of displacement for said magnets from a horizontal static position of less than 1 degree.

29. The dynamic magnet system of claim 28, further comprising a conductor oriented with respect to said support structure and magnets so that movement of said magnets induces an electrical current in said conductor.

30. The dynamic magnet systems of claim 29, said conductor comprising at least one coil wound on said support structure, said support structure being nonconductive.

31. The dynamic magnet system of claim 29, further comprising an operating system powered by said current.

* * * * *